United States Patent
Chu et al.

[11] Patent Number: 5,224,190
[45] Date of Patent: Jun. 29, 1993

[54] UNDERWATER OPTICAL FIBER CABLE HAVING OPTICAL FIBER COUPLED TO GROOVED METALLIC CORE MEMBER

[75] Inventors: Tek-Che Chu, Matawan, N.J.; Kenneth M. Kroupa, Roswell, Ga.; Clyde J. Lever, Jr., Buford, Ga.; Parbhubhai D. Patel, Dunwoody, Ga.; Seymour Shapiro, Brooklyn, N.Y.; Marsha S. Stix, Tinton Falls, N.J.; Roger A. Willby, Stone Mountain, Ga.

[73] Assignee: AT&T Bell Laboratories, Murray Hill, N.J.

[21] Appl. No.: 860,935

[22] Filed: Mar. 31, 1992

[51] Int. Cl.⁵ .............................................. G02B 6/44
[52] U.S. Cl. ................................ 385/107; 385/103; 385/102; 385/104; 385/105
[58] Field of Search ............. 385/100, 101, 103, 104, 385/106, 107, 111, 112, 113, 114, 102, 105; 174/70 R, 70 S

[56] References Cited

U.S. PATENT DOCUMENTS

| | | | |
|---|---|---|---|
| 4,381,140 | 4/1983 | van der Hoek et al. | 385/104 |
| 4,388,800 | 6/1983 | Trezequet | 385/104 |
| 4,389,088 | 6/1983 | Trezequet | 385/107 |
| 4,422,889 | 12/1983 | Trezequet et al. | 385/104 |
| 4,484,963 | 11/1984 | Anctil et al. | 385/102 |
| 4,538,881 | 9/1985 | Anctil et al. | 385/107 |
| 4,775,213 | 10/1988 | Kitayama | 385/101 |
| 4,793,686 | 12/1988 | Saito | 385/101 |
| 4,820,014 | 4/1989 | Nishimura et al. | 385/105 X |
| 4,832,443 | 5/1989 | Cameron et al. | 385/101 |
| 4,842,438 | 6/1989 | Bortolin et al. | 385/105 X |
| 5,007,703 | 4/1991 | Hale et al. | 385/102 |
| 5,125,061 | 6/1992 | Marlier et al. | 385/101 |
| 5,150,443 | 9/1992 | Wijnberg | 385/107 |

*Primary Examiner*—Brian Healy
*Attorney, Agent, or Firm*—Edward W. Somers; Donald E. Hayes, Jr.

[57] ABSTRACT

An optical fiber cable (20) includes a longitudinally extending copper core member (34). The core member is formed with at least one groove (36) in which is disposed at least one optical fiber. The optical fiber is coupled sufficiently to the core member preferably by an ultraviolet light energy cured material to substantially inhibit relative movement between the optical fiber and the core member when forces are applied to the cable. A sheath system which includes a plastic jacket (112) is disposed about the core member. The sheath system includes a strength member system which includes longitudinally extending copper wires (105, 105) and steel wires (101, 107). Disposed about the steel and copper wires is a steel shield (110) which provides hermetic protection for the optical fibers. A water-blocking material (108) is disposed among the wires and between an inner layer of the wires and the core member to cooperate with the compressive engagement of the inner layer of strength members with the core member to couple the strength members to the core member.

24 Claims, 3 Drawing Sheets

UNDERWATER OPTICAL FIBER CABLE HAVING OPTICAL FIBER COUPLED TO GROOVED METALLIC CORE MEMBER

TECHNICAL FIELD

This invention relates to an underwater optical fiber cable having optical fiber coupled to a grooved metallic core member. More particularly, this invention relates to an underwater optical fiber cable in which optical fibers are disposed within grooves formed in a metallic core member and in which the optical fibers are coupled sufficiently to the metallic core member to substantially inhibit relative movement between the optical fiber and the core member when forces are applied to the cable.

BACKGROUND OF THE INVENTION

Optical fibers are in widespread use today as transmission media because of their large bandwidth capabilities and small size. However, they are mechanically fragile, exhibiting fracture under some forms of tensile loading and degraded light transmission when bent. The degradation in transmission which results from bending is known as macro- or microbending loss. Accordingly, cable structures have been developed to protect mechanically the optical fibers thereby rendering them a reliable transmission medium in various environments.

Because of the broadband characteristics of optical fibers, together with the relatively few repeaters per length of cable which are required in a transmission system of significant length, optical fibers are well suited for intercontinental and other undersea communications. Of course, optical fibers used in such environments must be packaged in a suitable, cost effective cable structure.

Underwater or submarine cables as they are often called have special requirements. One major challenge confronting optical fibers used in submarine cables is the need for hermetic protection of the optical fibers against moisture. This is important because of the mechanical stresses experienced by an underwater cable during laying and recovery. Through a phenomenon known as static fatigue, the combination of moisture and stress on an optical fiber has been found to degrade the strength of optical fiber. Further, an underwater optical fiber cable must include provisions for an efficient direct current (D.C.) path for powering optical repeaters in the system and must be sufficiently strong to withstand the above-mentioned stress and years of operation in an underwater environment.

The foregoing problems have been overcome by a submarine cable for optical communications which is disclosed in U.S. Pat. No. 4,156,104 which issued on May 22, 1979 in the name of R. C. Mondello. In it, a core comprises a longitudinally extending strength member which may be a high strength conductive or dielectric material and which is referred to as a kingwire. A plurality of helically stranded optical fibers are embedded in a layer of a plastic material such as Hytrel ® plastic material which is disposed about the kingwire. About the layer of plastic material may be disposed a protective cover of nylon or other relatively high melting point material. Several layers of steel wires are stranded about the protective cover and are held in engagement with the protective cover by a tubular copper shield or barrier which hermetically seals the core. The copper barrier also is effective to provide a conductive path for powering repeaters and also is effective to hold together components of the cable package. The wires, especially those for an innermost layer, are effective to provide resistance to the hydrostatic pressures experienced by the cable during use. A jacket comprising polyethylene plastic material is disposed about the hermetic barrier. If desired for added toughness, a separate higher density polyethylene outer jacket may be included. In the manufacture of such a cable, a waterblocking material is interspersed among the wires and between an inner layer of the wires and the core.

The prior art also includes U.S. Pat. No. 4,484,963 which issued on Nov. 27, 1984, in the names of S. N. Anctil, R. F. Gleason, D. A. Hadfield, J. S. B. Logan, Jr., and A. G. Richardson. In it, a core comprises a kingwire which is enclosed by an elastomeric material in which are embedded a plurality of optical fibers. A protective cover of nylon applied to the elastomeric material has a layer of adhesive material applied thereto. The adhesive material forms a tight bond between the nylon cover and a first layer of steel wires which are stranded about the cover. This bond prevents creep and assures that the core tracks the steel wires during cable laying, cable recovery and in-service operations. A second layer of steel wires is stranded about the first layer and a conductive tubular member made of copper is formed thereover. A plastic jacket is disposed about the copper tubular member.

The foregoing cable structures may be classified as being tightly coupled because the optical fibers are tightly coupled to the kingwire through the plastic material and thereby experience substantially the same strain as other cable components. However, accessing individual optical fibers is somewhat difficult in such cables. Further, compressive forces which are applied laterally to the core during the manufacture of the cable are experienced by the optical fibers through the plastic material in which the fibers are embedded. Also, the copper shield is an expensive element of the cable structure.

Alternate arrangements have been used in underwater cables. One of these is a cable referred to as a slotted core optical cable in which a centrally disposed core member is made of a plastic material and includes a plurality of optical fiber receiving grooves with each groove opening to an outer surface of the core member. One or more optical fibers is positioned in each of the grooves. A viscous filling material is injected into each groove and allows relative movement between the fibers and the core member to occur. See U.S. Pat. No. 4,548,664. In another slotted core cable structure, the grooves are partially filled with a material which is viscous at cable operation temperature but which is cooled to reversibly harden the material. Optical fibers are positioned in each groove after which each groove is topped out with the viscous material. See U.S. Pat. No. 4,422,889.

Slotted core cables facilitate access to the optical fibers and isolate optical fibers in the grooves from laterally applied compressive forces. However, with a plastic core member, wire-like strength members must be caged carefully about the core member to avoid undue stresses therein. Also, in contrast to the cable of the Mondello patent, the slotted core cables just described are characterized by a loose coupling between the optical fibers and the core member.

An enhancement which is included in underwater optical fiber cable having fibers tightly coupled to a core thereof is that of uniform recovery of the fibers along the cable length when loads imposed axially on the cable during manufacturing and installation are removed. For the long lengths of cable used in underseas applications, recovery in length following removal of installation tensile loads most likely will result in non-uniform length recovery of optical fibers which are not coupled sufficiently to other portions of the cable.

This problem may be solved by causing the optical fibers to be coupled tightly to a core member. In that way, the optical fibers and the core member move together and experience substantially the same strain. If this does not occur, then when loads are removed from the cable, the optical fiber may experience excessive undulations, resulting in microbending. Such a problem is exacerbated in underwater cables where the strains experienced are much greater than those experienced by terrestrial cables.

Seemingly, the prior art does not include an optical fiber cable which is adaptable to a variety of environments and which includes a tight coupling between the optical fiber and a core member as well as one that may be manufactured inexpensively. The desired cable structure should accommodate a plurality of optical fibers in a structure which is cost reduced over those of the prior art, which provides enhanced robustness and which provides a sealing of the cable. Also, the sought after cable desirably provides the capability for easily accessing the optical fibers.

SUMMARY OF THE INVENTION

The foregoing problems of the prior art have been overcome by cable of this invention. An optical fiber cable comprises a longitudinally extending metallic core member which includes a groove which opens to an outer surface of the core member. In a preferred embodiment, the core member is made of copper. At least one optical fiber is disposed within the groove. Means are provided for coupling sufficiently the optical fiber within the groove to the core member to substantially inhibit relative movement between the optical fiber and the core member when forces are applied to the cable. Sheath means which include a layer of copper wires are disposed about the core member.

In the preferred embodiment, the sheath system includes a plurality of layers of wire-like strength members. The strength members in at least one layer are made of copper and others are made of steel. Also, the sheath system includes a cost-effective steel shield. Further, the sheath system is coupled to the core member by a waterblocking material which is disposed in interstices among wire-like strength members and between an inner layer of the strength members and the core member.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
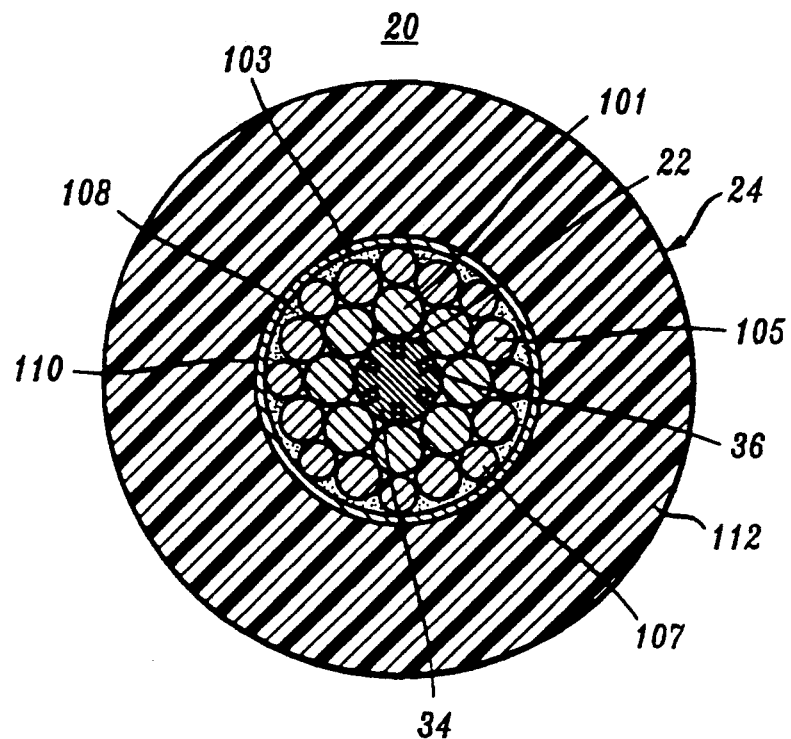
FIG. 1 is an end view of an optical fiber cable of this invention.

Referring now to FIG. 1, there is shown an optical fiber cable which is designated generally by the numeral 20. As can be seen in FIG. 1, the cable 20 includes a core which is designated generally by the numeral 22 and a sheath system which is designated generally by the numeral 24.

Figure 2:
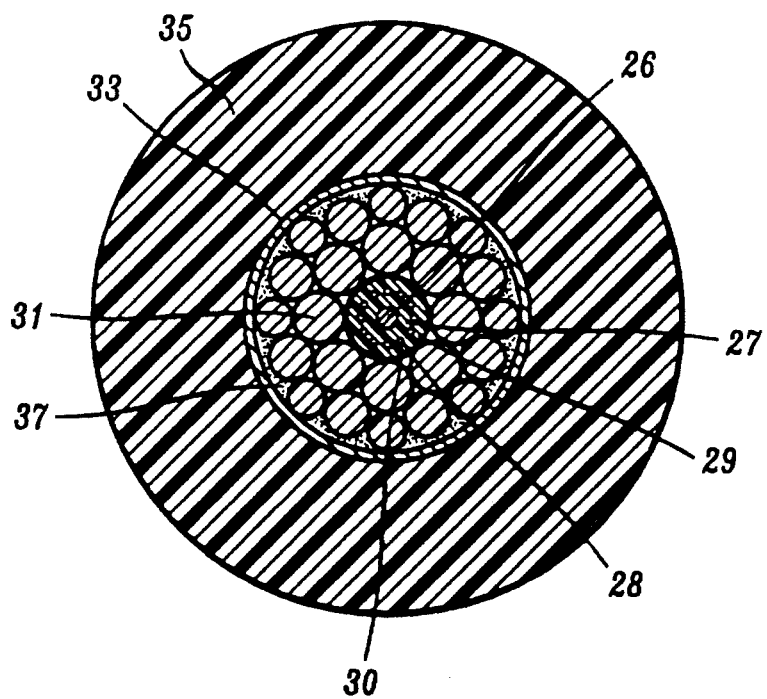
FIG. 2 is an end view of a prior art optical fiber cable.

The cable 20 is ideally suited for underwater use and is intended to be used instead of those of the prior art because of its advantages. A typical underwater cable 25 of the prior art is depicted in FIG. 2. As can be seen, the cable 25 includes a core comprising a centrally disposed, longitudinally extending strength member 26 which is referred to as a kingwire. The strength member 26 may be made of a conductive material such as copper-clad steel, for example. About the strength member 26 is disposed a plastic material 27 having a high flexural modulus. Such a material is one available under the trade designation Hytrel ® plastic material. A plurality of optical fibers 28—28 each comprising a glassy core and cladding and one or more layers of a coating material are spaced circumferentially about the layer 27. An additional layer 29 of Hytrel plastic material is disposed about the optical fibers 28—28, causing the optical fibers to be embedded in the Hytrel plastic material. A sheath system comprising a layer 30 of nylon plastic material is disposed about the second layer of Hytrel plastic material.

Disposed about the layer 30 of nylon of the prior art cable of FIG. 2 is a strength member system which is formed from a plurality of stranded steel wires 31—31 which are wrapped in superimposed layers about the core. To complete a D.C. path of the cable, a non-porous conductive shield 33 made of copper or aluminum is disposed about the outer layer of the wires 31—31. In addition to forming an efficient D.C. conducting path for powering optical repeaters (not shown) spaced at intervals along the cable, the shield 33 serves as a highly effective moisture barrier for the optical fibers. The shield 33 also provides a positive clamping action on the wires 31—31. A plastic jacket 35 is formed over the shield 33. Such a prior art cable is disclosed in priorly mentioned U.S. Pat. No. 4,156,104 which is incorporated by reference hereinto. An outer surface of the shield 33 is provided with an adhesive which bonds to the jacket 35. A waterblocking material 37 is disposed in interstices among the wires and between an inner layer of the wires and the core to couple the wires to the core.

Figure 3:
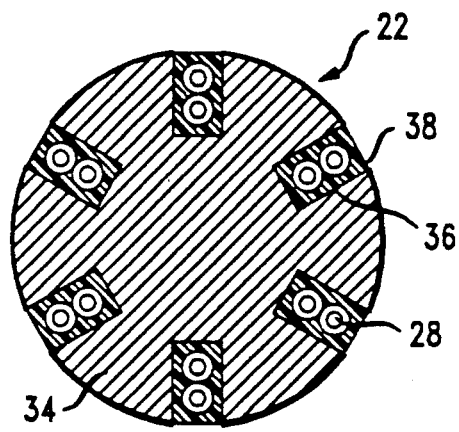
FIG. 3 is an end view of a core which is included in optical fiber cable of this invention.

The core 22 of the embodiment of the cable 20 of FIG. 1 is shown in detail in FIG. 3. Another core is disclosed and claimed in commonly assigned application Ser. No. 07/860,960 filed of even date herewith in the names of T. C. Chu, K. M. Kroupa, C. J. Lever, and P. D. Patel pending. The core 22 comprises a longitudinally extending centrally core member 34 which has a circular cross section in a plane normal to a longitudinal axis of the core. The core member 34 made of a metallic material and in a preferred embodiment is made of copper.

As is seen in FIG. 3, the longitudinally extending core member 34 includes a plurality of grooves 36—36 each of which is formed radially of the core member. Further, each groove may have parallel sidewalls or may be formed so that the sidewalls are tapered slightly. That is, the sidewalls which define each groove may diverge or converge slightly toward a center of the core member.

At least one optical fiber is disposed in at least one of the grooves 36—36. For the embodiment shown in FIG. 3, each of the grooves 36—36 has a width measured circumferentially which is greater than the outer diameter of an optical fiber which is to be received in the groove. Of course, it should be understood that the optical fiber to be received in a groove may include one or more layers of coating materials and the outer diameter of the optical fiber is intended to mean the outer diameter of the core and cladding as well as of any coatings applied thereto. In the embodiment of FIG. 3, two optical fibers are disposed in each groove and along a radial line thereof. The depth of each groove 36 is greater than the product of two and the outer diameter of an optical fiber to be received in the groove. Further, in the preferred embodiment, the grooves 36—36 are straight along the length of the core member without intended stranding. In other embodiments, the grooves may be formed in a helical or in an oscillated manner along the core member.

Advantageously, the optical fibers disposed in each groove 36 are coupled tightly to the core member. As such, they are secured therein against movement. This is accomplished by causing a matrix material 38 to be disposed in each groove 36. In a preferred embodiment, the matrix material 38 comprises an ultraviolet (UV) light energy cured plastic material such as that disclosed in U.S. Pat. No. 4,900,126, for example, which issued on Feb. 13, 1990, in the names of K. W. Jackson, G. A. Lochkovic, P. D. Patel, M. L. Pearsall and J. R. Petisce and which is incorporated by reference hereinto.

The matrix material 38 is effective together with the optical fibers to provide an in-situ formed optical fiber ribbon. Typically, some of the matrix material becomes disposed between adjacent optical fibers. Also, as can be seen in FIG. 3, an outer surface of the matrix material in each groove has a concave configuration. With such a configuration, the matrix material in each groove escapes any abuse by a surrounding sheath system.

Also, as well be recalled, each groove 36 has a width and a depth which exceeds the width and depth of the dimensions of the fiber array only. This is done to accommodate the matrix material in each groove. For example, for the embodiment of FIG. 3, each optical fiber has an outer diameter of about 0.010 inch and the depth of each groove is about 0.030 inch.

There are numerous advantages in using an ultraviolet light energy cured material to hold the optical fibers in the grooves. Such a material is a thermoset material that is not distorted during further cable processing such as during the application of the jacket plastic. Also, the UV matrix material is effective to form an optical fiber ribbon sized to an associated groove. Further, the use of the UV cured matrix material allows easy access of the optical fiber or optical fibers in each groove.

Figure 4:
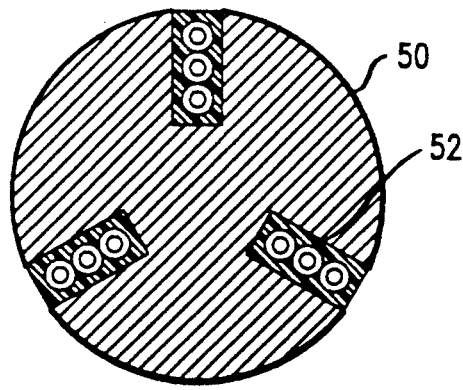
FIG. 4 is an end view of a core which includes radially disposed grooves.

The groove geometry of the core member 34 which is depicted in FIG. 3 is one of many contemplated by this invention. In the embodiment depicted in FIG. 4, a core member 50 includes three grooves 52—52 each adapted to receive three optical fibers.

Figure 5:
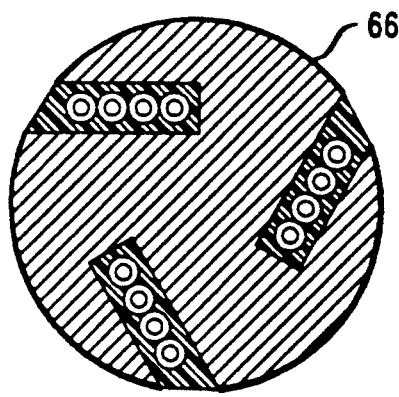
FIG. 5 is an end view of a core which includes grooves which are not radially disposed.

In FIG. 5 is shown a core member which grooves are not disposed radially. A core member 66 includes a plurality of grooves each disposed along a chordal line of the cross section. Each inner end of each groove is disposed along a radius of the core member and a sidewall of the groove which is disposed toward a longitudinal center axis of the core member is parallel to a tangent to a circle which is concentric with an outer periphery of the core member. Further, each groove in the embodiment of FIG. 5 holds four optical fibers.

Figure 6:
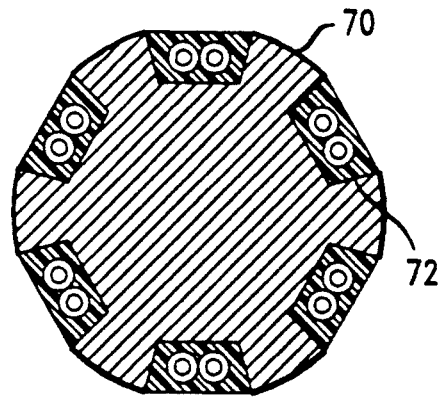
FIG. 6 is an end view of a core in which grooves have a depth to accommodate a single coated optical fiber.

The core member also may be structured so that the depth of each groove accommodates a single optical fiber having one or more layers of coating material thereon. As is seen in FIG. 6, a core member 70 may include a plurality of grooves 72—72 each adapted to hold two optical fibers. The depth of each groove 72 as measured radially of the core member is greater than the diameter of a coated optical fiber. Again the core member 70 in the preferred embodiment is made of copper.

Figure 7:
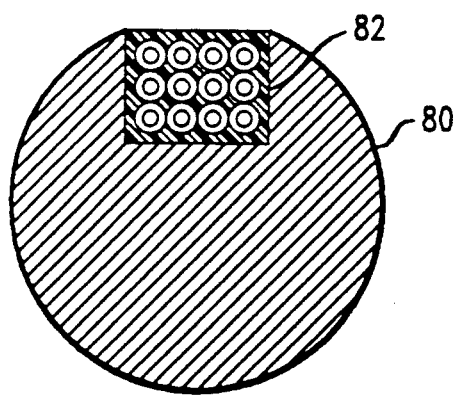
FIG. 7 is an end view of a core member in which is formed a single groove.

In other embodiments of this invention, a core member 80 (see FIG. 7) includes one groove 82 in which are disposed three rows of four optical fibers each. The groove 82 is formed such that its width is greater than the product of four and the outer diameter of an optical fiber and its depth, as measured radially of the core member, is greater than the product of three and the outer diameter of an optical fiber.

Figure 8:
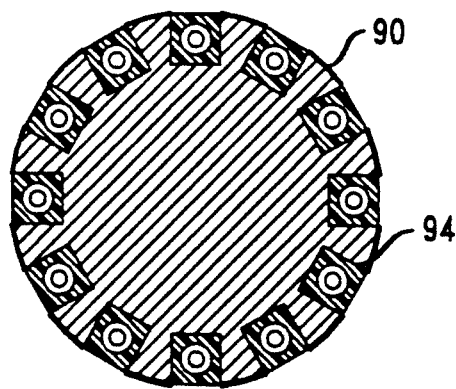
FIG. 8 is an end view of a core member which includes a plurality of grooves in each of which is disposed a single fiber.

A still further embodiment is shown in FIG. 8 which includes a core member 90. A plurality of grooves 94—94 are formed in the strength member with an axis of each directed radially. Each groove 94 is formed to accommodate one optical fiber and a portion of a securing material such as a UV cured plastic material.

Returning now to FIG. 1, it can be seen that the sheath system 24 includes a plurality of strength members 101—101, preferably steel wires or strands, which are arranged in an inner layer about the core 22. Disposed about the strength members 101—101 of the inner layer is a layer 103 comprising a plurality of strength members 105—105 at least some of which are copper. In the preferred embodiment, eight of sixteen wires in the outer layer are made of copper. Interposed between adjacent ones of the copper wires 105—105 is a strength member 107 such as a steel wire.

The strength members, are coupled to the copper core member. This is accomplished by the way in which the strength members are wrapped helically about the core member. The wrapping is accomplished so that the strength members of the inner layer are in compressive engagement with the core member. Supplementing the compressive engagement of the wires 101—101 with the core member is a waterblocking material 108. The waterblocking material is dispersed among the strength members 101—101, 105—105, and 107—107 and between the strength members 101—101 of the inner layer and the core member 34.

Further, by using a copper core member, the process of caging the strength members about the core member need not be as precise as when a plastic core member is used. Further, the inner layer of strength members can be in compressive engagement with the covered core member in order to achieve coupling therebetween. With a plastic core member, strength members are carefully caged thereabout to avoid unduly stressing the core member.

Also, because of the more robust core member, all the strength members need not be made of steel. Because of the inclusion of copper wires to provide a D.C. path, the need for a copper shield is obviated. Instead, a shield 110, which is made of a material such as steel, for example, which has a conductivity substantially less than that of copper, encloses the copper wires and the steel wires to provide hermetic protection. The shield 110 is formed about the wires to have a longitudinal seam. Adjacent longitudinal portions of the shield 110 are welded together. Disposed about the shield 110 is a plastic jacket 112 which in a preferred embodiment is made of medium density polyethylene. An outer surface of the shield 110 is provided with an adhesive material to cause the shield to become adhered to an inner surface of the jacket 112.

It should be realized that whereas single optical fibers are positioned singly or in multiples in the grooves of the core member, the invention also includes those cables and core members in which an optical fiber ribbon such as disclosed in aforementioned U.S. Pat. No. 4,900,126 is disposed in ones or all of the grooves.

Also, it should be realized that every groove in a core member need not have an optical fiber or fibers positioned therein. A manufacturer may standardize on a particular core member which includes six radially disposed grooves, for example, and for a particular order may position optical fibers only in three of these grooves. In those situations, matrix material also may be caused to become disposed in the unused grooves, as well as in the grooves in which fiber is positioned in order to strengthen the core member and equalize stress therein. Of course, a manufacturer may optimize a core member structure such as the three groove core member depicted in FIG. 4. In an alternative embodiment, inexpensive fiber filler or fillers is caused to be disposed in those grooves in which transmission fiber is not disposed or in those grooves in which less than the number of optical fibers which can be accommodated therein are actually disposed therein. This may result in cost savings over the use of additional matrix material to complete the filling of such grooves.

Color coding may be used to identify ones of the optical fibers. This may be done by color coding the optical fibers themselves. In alternative embodiments, the matrix material in each groove may be selectively colored or a colored cap may be used to top out the matrix material in each groove. The curable material which is disposed in each groove to couple the fiber or fibers therein to the core member may be a relatively low modulus material and a relatively small amount of a high modulus material having a color used to cap out the groove. In another embodiment, a bed of a colorant material on an inner surface of each groove is adapted to adhere to the matrix material and be removed with the matrix material when the optical fibers are removed from each groove. Of course, the matrix material in each groove or the copper core itself could be marked mechanically or by a laser.

Cable of this invention has numerous advantages. The cable of this invention has improved access to the optical fibers. Herein, after the core member is exposed, it becomes relatively easy to access the fibers in the grooves. In the prior art, it will be recalled, the fibers were embedded in the core member in one general matrix material. The steel shield, which replaces the expensive prior art copper shield, provides the cable with enhanced robustness and resistance to compression as well as low cost hermetic protection. The copper core member which replaces a plastic core member and the layer of copper wires provide conductive paths. The cost of the copper core member is more than offset by the use of a steel shield instead of a copper shield. Robustness also is enhanced because of the increased rigidity of the core member.

It is to be understood that the above-described arrangements are simply illustrative of the invention. Other arrangements may be devised by those skilled in the art which will embody the principles of the invention and fall within the spirit and scope thereof.

We claim:

1. An optical fiber cable, which comprises:
   a longitudinally extending metallic core member which includes a groove which opens to an outer surface of the core member;
   at least one optical fiber which is disposed within said groove;
   means for coupling sufficiently said optical fiber to said core member to substantially inhibit relative movement between said optical fiber and said core member when forces are applied to said cable; and
   sheath means including a metallic shield which is comprised of a material having a conductivity which is substantially less than that of copper disposed about the core member.

2. The cable of claim 1, wherein said longitudinally extending core member is made of copper.

3. The cable of claim 1, wherein said metallic shield of said sheath means is made of steel.

4. The cable of claim 1, wherein said core member includes a plurality of grooves each of which opens to an outer surface of said core member and wherein at least one optical fiber is disposed in at least one of said plurality of grooves and said coupling means is disposed in each said groove.

5. The optical fiber cable of claim 1, wherein said means for coupling said optical fiber to said core member includes means disposed in said groove for securing said optical fiber against movement relative to said core member.

6. The cable of claim 5, wherein said means for securing said optical fiber against movement includes an ultraviolet light energy cured plastic material.

7. The cable of claim 6, wherein a curable plastic material in each groove has an outwardly facing concave surface after it has been cured.

8. The cable of claim 1, wherein said core member is coupled to said sheath system.

9. The cable of claim 8, wherein said sheath means includes a plurality of layers of wire-like strength members with an inner layer of strength members in compressive engagement with said core member and with ones of the strength members of at least one layer being made of copper.

10. The cable of claim 9, wherein a waterblocking material is disposed in interstices among said wire-like strength members and between said wire-like strength members of said inner layer and said core member.

11. The cable of claim 10, wherein said sheath means includes steel wire strength members which are wrapped about said inner layer.

12. The cable of claim 1, wherein sidewalls of said groove are parallel to each other.

13. The cable of claim 1, wherein said core member includes a plurality of radially directed grooves in each of which is disposed at least one optical fiber.

14. The cable of claim 1, wherein said core member includes a plurality of grooves in each groove of which are disposed at least two optical fibers with the width of each groove as measured along a periphery of said core member being greater than the diameter of one of the optical fibers.

15. The cable of claim 1, wherein said core member includes a plurality of grooves in each groove of which in a radial direction are disposed n optical fibers with the depth of each groove as measured radially of said core member being greater than the product of n and an outer diameter of an optical fiber.

16. The cable of claim 1, wherein said groove in said core member is straight.

17. The cable of claim 1, wherein said sheath means includes an outer jacket.

18. The cable of claim 17, wherein said outer jacket comprises a polyethylene plastic material.

19. An optical fiber cable core, which includes:

a longitudinally extending metallic core member which includes a groove which opens to an outer surface of the core member;

an optical fiber which is disposed within said groove; and means for coupling sufficiently said optical fiber to substantially inhibit relative movement between said core member and said optical fiber when forces are applied to said core member.

20. The optical fiber cable core of claim 19, wherein said means for coupling said optical fiber to said core member includes an ultraviolet light energy cured plastic material which is disposed in said groove.

21. The optical fiber cable core of claim 20, wherein a curable plastic material in each groove has a concave surface after it has been cured.

22. The optical fiber cable core of claim 19, wherein said longitudinally extending core member is made of copper.

23. The optical fiber cable core of claim 19, wherein said longitudinally extending core member includes a plurality of longitudinally extending grooves with sidewalls of each groove being parallel to each other.

24. The optical fiber cable core of claim 19, wherein said core member includes a plurality of radially directed grooves and wherein in at least one of which is disposed at least one optical fiber.

* * * * *